US012559045B2

(12) United States Patent
Nakayama et al.

(10) Patent No.: US 12,559,045 B2
(45) Date of Patent: Feb. 24, 2026

(54) VEHICLE WITH CAMERA PROVIDED ON GARNISH ON EDGE OF WINDOW PANEL

(71) Applicant: HONDA MOTOR CO., LTD., Tokyo (JP)

(72) Inventors: Shingo Nakayama, Tokyo (JP); Tadahiro Matori, Tokyo (JP); Akira Fujita, Tokyo (JP); Yuhei Tanaka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 329 days.

(21) Appl. No.: 18/461,101

(22) Filed: Sep. 5, 2023

(65) Prior Publication Data

US 2024/0083369 A1 Mar. 14, 2024

(30) Foreign Application Priority Data

Sep. 9, 2022 (JP) ................................. 2022-143398

(51) Int. Cl.
*B60R 11/04* (2006.01)
(52) U.S. Cl.
CPC .................................... *B60R 11/04* (2013.01)
(58) Field of Classification Search
CPC . B60R 11/04; B60R 2011/0026; B60R 1/001; B60R 2011/0043; B60R 2011/0047; B60R 2300/105
See application file for complete search history.

(56) References Cited

U.S. PATENT DOCUMENTS

| | | | |
|---|---|---|---|
| 8,872,919 B2 | 10/2014 | Watanabe et al. | |
| 2006/0192660 A1 | 8/2006 | Watanabe et al. | |

| | | | | |
|---|---|---|---|---|
| 2018/0244195 A1* | 8/2018 | Haight | .................. | G01S 13/862 |
| 2019/0200416 A1* | 6/2019 | Shinkai | .................. | B60R 11/04 |
| 2020/0193005 A1* | 6/2020 | Babala | .................. | G06V 40/70 |
| 2020/0195831 A1* | 6/2020 | Muramatsu | ............ | H04N 23/90 |
| 2022/0222465 A1* | 7/2022 | Thooris | .................. | G06V 40/16 |

FOREIGN PATENT DOCUMENTS

| | | | | |
|---|---|---|---|---|
| DE | 102016001913 A1 * | 8/2017 | ........ | B60R 11/0235 |
| DE | 102018213248 A1 * | 2/2020 | ............ | B60R 11/04 |
| JP | 1993044687 U | 6/1993 | | |
| JP | 2002127948 A | 5/2002 | | |
| JP | 4752284 B2 | 8/2011 | | |
| JP | 2021172300 A | 11/2021 | | |
| KR | 20220032191 A * | 3/2022 | .......... | B60R 25/305 |
| KR | 20220123159 A * | 9/2022 | ............ | B60W 40/10 |
| WO | 2018155280 A1 | 8/2018 | | |

OTHER PUBLICATIONS

Office Action received for Japanese Patent Application 2022-143398 received Mar. 19, 2024; 6 pps.

* cited by examiner

*Primary Examiner* — Robert E Fuller
(74) *Attorney, Agent, or Firm* — Armstrong Teasdale LLP

(57) ABSTRACT

A vehicle includes a vehicle body having a passenger opening on a side, and a camera rearward of the passenger opening. The camera has an optical axis oriented in a laterally outward and frontward direction. A door with a side mirror is provided at the passenger opening and has a door window in its upper part. The camera may be located above a lower end of the door window and/or above an upper end of the side mirror. An extension window is provided rearward of the passenger opening, with a garnish member at an edge of the extension window. The camera may be provided on the garnish member.

9 Claims, 9 Drawing Sheets

Fig.5

VEHICLE WITH CAMERA PROVIDED ON GARNISH ON EDGE OF WINDOW PANEL

TECHNICAL FIELD

The present invention relates to a vehicle provided with a camera for capturing an image of a surrounding area of the vehicle.

BACKGROUND ART

In recent years, there have been increasing efforts to provide sustainable transport systems designed in consideration of vulnerable people involved in transport. As a part of these efforts, the inventors have conducted research and development on preventive safety technology, with a goal of improvement of traffic safety and usability. Patent Document 1 discloses a vehicle provided with cameras, including one on a side mirror (door mirror). This configuration of the prior art enables the camera(s) to capture images of a view in a laterally outward and frontward direction from the side mirror of the vehicle.

PRIOR ART DOCUMENT(S)

Patent Document(s)

Patent Document 1: JP4752284B2

SUMMARY OF THE INVENTION

Task to be Accomplished by the Invention

However, in the case of using a camera provided on a door mirror, there is a problem that the area captured by the camera changes depending on whether the door is opened or closed. More specifically, the problem is that, when the door is open, a surrounding area along a side of a vehicle becomes out of the view of the camera. Another problem is that this design of the prior art does not allow for capturing images of passengers getting on and off the vehicle.

The present invention has been made in view of the problems of the prior art, and a primary object of the present invention is to provide a vehicle configured to allow for capturing images of a surrounding area along a side of the vehicle regardless of a door is opened or closed. Another object of the present invention is to provide technology that makes a contribution to the development of sustainable transportation systems.

Means to Accomplish the Task

In order to accomplish the object, an aspect of the present invention provides a vehicle (1), comprising:

a vehicle body having a passenger opening (3B) on a side thereof; and a camera (7A) provided on the side of the vehicle body and rearward of the passenger opening, such that the camera has an optical axis (8A) oriented in a laterally outward and frontward direction.

This configuration allows for capturing an image of a surrounding area along a side of a vehicle regardless of a door is opened or closed. This configuration also allows for capturing images of passengers getting on and off the vehicle.

The above vehicle may be further configured such that the vehicle body comprises a door (4B) at the passenger opening, wherein the door has a door window (5) in an upper part thereof, and wherein the camera is located above a lower end of the door window.

This configuration prevents dust and liquid blown up from the road surface from reaching the camera.

The above vehicle may be further configured such that the door is provided with a side minor (12), and wherein the camera is located above an upper end of the side mirror.

This configuration allows a camera to capture an image of a frontward view of the vehicle from above the door mirror.

The above vehicle may be further configured such that the vehicle body comprises an extension window (13) located on the side thereof and rearward of the passenger opening, wherein a garnish member (15) is provided at an edge of the extension window, and wherein the camera is provided on the garnish member.

This configuration allows for simplification of a mount structure for mounting the camera to the vehicle body. Moreover, this configuration allows the camera and the garnish member to be prepared as an assembly.

The above vehicle may be further configured such that the garnish member comprises a base (16) which extends along the edge of the extension window, and on which the camera is placed, and a canopy (21) which projects laterally outward from the base and extends around the camera.

In this configuration, the canopy can protect the camera from liquid such as rainwater and dust. In addition, the canopy can prevent objects such as stones and people from coming into contact with the camera.

The above vehicle may be further configured such that the canopy has an upper end and a lower end that are bonded to the base, and a middle part extending more laterally outward than the upper and lower ends, wherein the canopy and the base define an accommodation space (22) therebetween, and wherein the camera is located within the accommodation space.

In this configuration, the accommodation space extending in a front-rear direction allows for the rearward discharge of liquid such as rainwater and foreign substances that have entered the accommodation space.

The above vehicle may be further configured such that the base has a raised portion (17) that protrudes laterally outward in the accommodation space, and wherein the camera is provided on the raised portion.

This configuration enables the optical axis of the camera to be directed frontward.

The above vehicle may be further configured such that the raised portion is coupled to the middle part of the canopy so that the accommodation space is divided into an upper accommodation space above the raised portion and a lower accommodation space below the raised portion.

This configuration can improve the rigidity of the canopy.

The above vehicle may be further configured such that a window panel (14) is provided on the extension window, and wherein the camera is placed on an inner side of the window panel so that the optical axis of the camera extends outward through the window panel.

This configuration enables a camera to be placed on the interior side of the window panel, thereby making it easier to protect the camera. This configuration also reduces wind noise caused by part of the camera that projects outward.

The above vehicle may be further configured such that the window panel is provided with a colored layer (32) and a transparent part (34) that faces the camera, wherein the colored layer extends on the window panel so as not to cover the transparent part.

This configuration ensures that the field of view of the camera is unobstructed

Effect of the Invention

According to the present invention, a vehicle is configured to allow for capturing an image of a surrounding area along a side of the vehicle regardless of whether a door is opened or closed.

BRIEF DESCRIPTION OF THE DRAWINGS

FIG. 5 is a perspective view showing a garnish member according to a variant of the embodiment;

DESCRIPTION OF THE PREFERRED EMBODIMENT(S)

Figure 1:
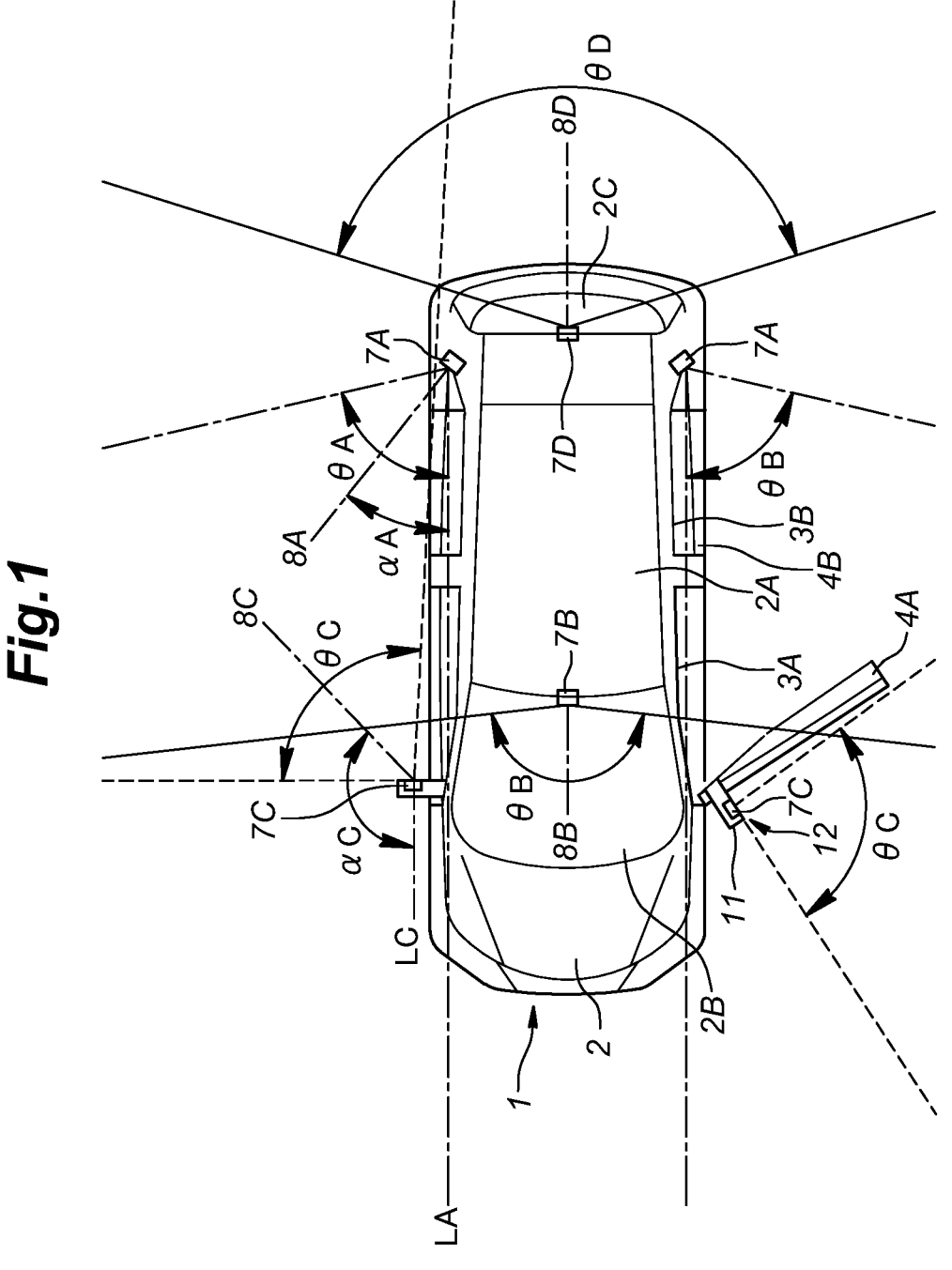
FIG. 1 is an explanatory diagram of a vehicle according to an embodiment of the present invention.
Figure 2:
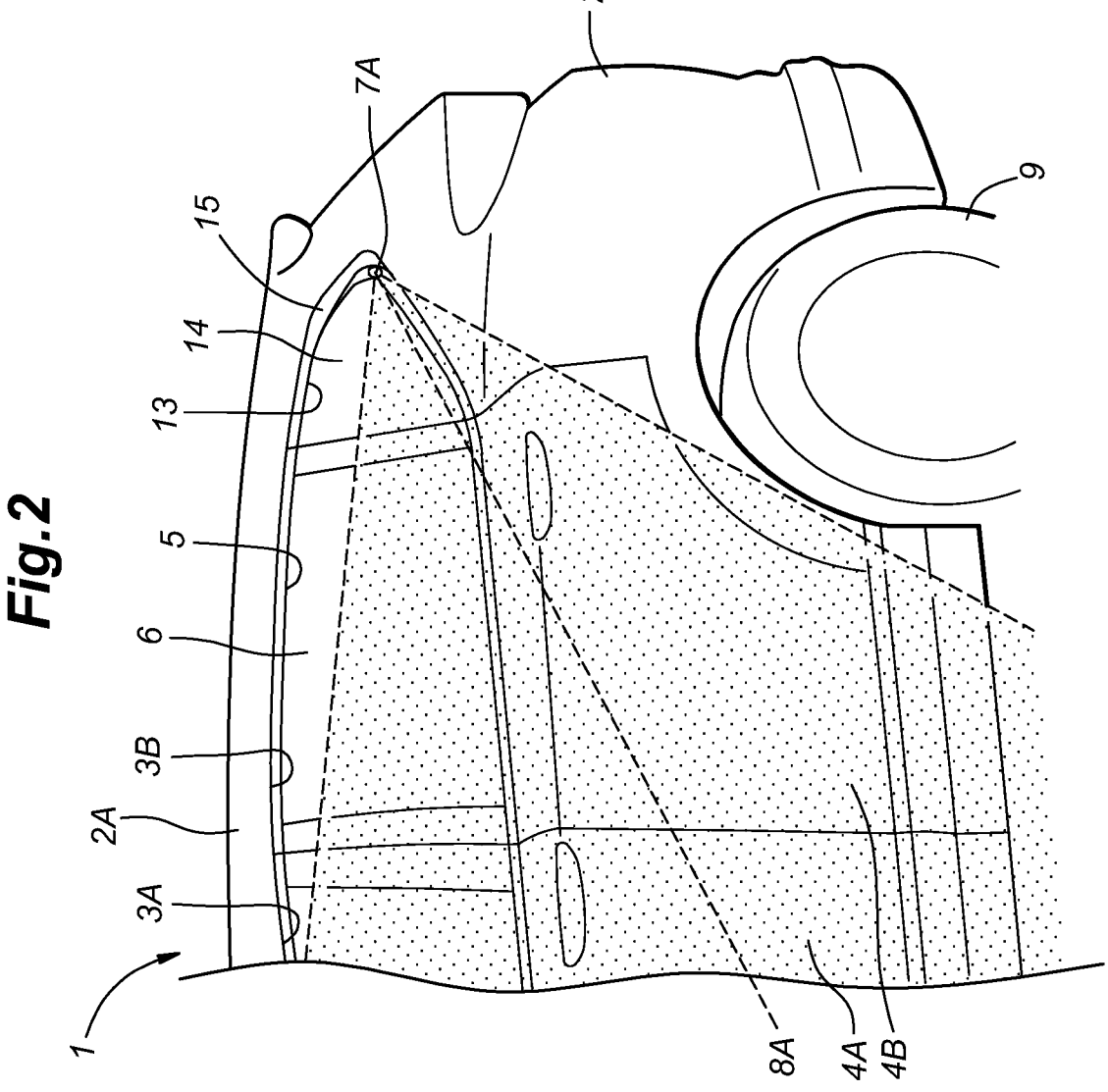
FIG. 2 is a perspective view showing a side of a vehicle body.

A vehicle according to an embodiment of the present invention will be described with reference to the drawings. As shown in FIGS. 1 and 2, the vehicle 1 is a four-wheel automobile. The vehicle 1 may be of any known type of vehicle such as a sedan, an SUV, a wagon, or a van. The vehicle 1 according to the present embodiment is an SUV. At least one passenger opening 3 is provided on each of the left and right sides of a vehicle body 2 of the vehicle 1. One or more passenger openings 3 include a front passenger opening 3A and a rear passenger opening 3B. The passenger openings 3A, 3B are provided with respective doors 4A, 4B. Each of the doors 4A and 4B has a door window 5 in an upper part thereof. Each door window 5 is provided with a window panel 6.

As shown in FIG. 1, the vehicle body 2 is provided with a plurality of cameras 7A-7D. The plurality of cameras 7A-7D may be known as CMOS image sensors or CCDs. In the present embodiment, the cameras 7A-7D include first to fourth cameras 7A-7D. Left and right first cameras 7A are provided on the left and right outer side surfaces of the vehicle body 2 and rearward of the passenger openings 3, respectively. Specifically, the first cameras 7A are provided on the sides of the vehicle body 2 and rearward of the rear passenger opening 3B. The first cameras 7A are preferably arranged directly above rear wheels 9 of the vehicle 1. The first cameras 7A are preferably arranged rearward of the front end of the rear wheels 9 and frontward of the rear end of the rear wheels 9. The first cameras 7A may be arranged rearward of the center of the rear wheels 9. The first cameras 7A are preferably arranged below a roof 2A of the vehicle body 2. The first cameras 7A are preferably provided on the outer side surfaces of the vehicle body 2.

The optical axis 8A of each of the first cameras 7A is oriented in a laterally outward and frontward direction of the vehicle body 2. The horizontal angle of view (AOV) θA of each first camera 7A is preferably in the range of, for example, 70 to 130 degrees. The optical axis 8A of each first camera 7A preferably forms an angle αA of 35 to 65 degrees with the reference line LA extending frontward when viewed from above. The first cameras 7A can acquire images of views in the laterally outward directions to the left and right from the vehicle body 2 and views in frontward and laterally outward directions to the left and right from the vehicle body 2.

The optical axis 8A of each first camera 7A and the horizontal plane preferably form an angle of equal to or less than 30 degrees as seen from the side.

The second camera 7B is provided interior of the vehicle and at an upper part of a front window (wind shield) 2B. The second camera 7B captures images of a frontward view of the vehicle body 2. The optical axis 8B of the second camera 7B extends frontward of the vehicle body 2. The horizontal AOV θB of the second camera 7B is preferably in the range of, for example, 90 to 180 degrees.

Left and right third cameras 7C are provided on the left and right third doors 4A at their front parts. The third cameras 7C can capture images of views in rearward and laterally outward directions to the left and right from the vehicle body 2. The imaging angle range of each of the third cameras 7C changes depending on whether the corresponding door 4 is opened or closed. In the following, the orientation of each third camera 7C will be described assuming that a corresponding door 4 is in the closed position. The horizontal AOV θC of a third camera 7C is preferably in the range of, for example, 70 to 130 degrees. The optical axis 8C of a third camera 7C preferably forms an angle αC of 115 to 145 degrees with the reference line LC extending frontward as viewed from above. The front part of each front door 4 may be provided with a columnar support member 11 that protrudes outward in the left-right direction. Each third camera 7C may be provided on the support member 11. A side mirror 12 may be formed with a corresponding third camera 7C and a support member 11. In other embodiments, each side mirror 12 may be provided with an optical mirror.

A field of view (FOV) of the second camera 7B preferably overlaps that of each third camera 7C as viewed from above. An FOV of each first camera 7A preferably overlaps that of a corresponding third camera 7C, as viewed from above.

The fourth camera 7D is provided in a rear part of the vehicle body 2 and captures images of a rearward view from the vehicle body 2. The optical axis 8D of the fourth camera 7D extends rearward from the vehicle body 2. The horizontal AOV θD of the fourth camera 7D is preferably in the range of, for example, 130 to 180 degrees. The fourth camera 7D may be provided at the rear end part of the vehicle body 2 or may be provided interior of the rear window. The FOV of the fourth camera 7D may overlap that of each first camera 7A, as viewed from the above.

Each first camera 7A is preferably arranged above the lower end of a corresponding door window 5. Each first camera 7A is preferably located above the upper end of a corresponding side mirror. In the present embodiment, each first camera 7A is arranged above the upper end of a corresponding side mirror 12. Specifically, each first camera 7A is preferably arranged above the upper end of a corresponding support member 11.

As shown in FIG. 2, an extension window 13 is provided on each side of the vehicle body 2 and rearward of a corresponding passenger opening 3. In the present embodiment, an extension window 13 is provided on each side of the vehicle body 2 and rearward of a corresponding rear passenger opening 3B. The front edge of each extension window 13 connects to the rear edge of a corresponding rear passenger opening 3B. In other embodiments, a rear passenger opening 3B and a corresponding extension window 13 may be spaced apart from each other in the front-rear direction of the vehicle. In this case, a pillar may be provided between a rear passenger opening 3B and a corresponding extension window 13. A window panel 14 is attached to an extension window 13. The window panel 6 is preferably securely attached to the edge of a corresponding extension window 13.

A garnish member 15 is provided at the edge of an extension window 13. The garnish member 15 is preferably made of a plastic material. Each garnish member 15 includes a base 16 extending along the edge of a corresponding extension window 13. The base 16 extends along the edge of a corresponding window panel 6. The base 16 is arranged outside the vehicle along the respective edges of an extension window 13 and a window panel 6 so as to hide those edges. An extension window 13 has a shape such that its vertical width decreases toward the rear. An extension window 13 has a corner at its rear end. Each base 16 has a curved part 16A along which the corners of a corresponding extension window 13 extends.

Figure 3:
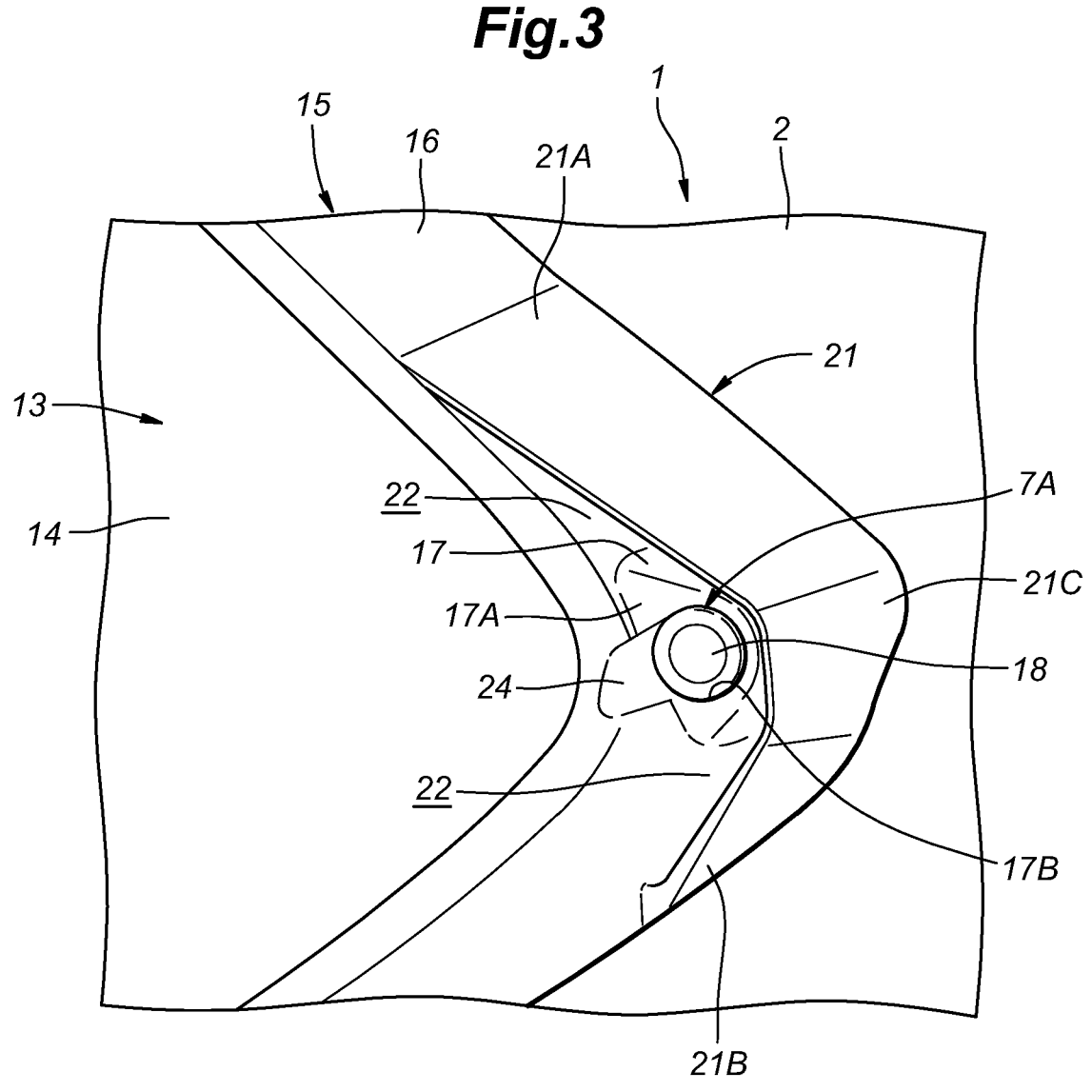
FIG. 3 is an enlarged perspective view of a garnish member of the vehicle.

As shown in FIG. 3, a first camera 7A is provided on a corresponding garnish member 15. Specifically, the first camera 7A is provided on the base 16 of the garnish member 15. The outer surface of the base 16 is provided with a raised portion 17 that protrudes laterally outward. The first camera 7A may be provided on the raised portion 17. The raised portion 17 has an inclined surface 17A oriented toward a laterally outward and frontward direction. A receiving hole 17B is formed in the inclined surface 17A for receiving a first camera 7A. A lens 18 of the first camera 7A is exposed outside from the inclined surface 17A. The first camera 7A is inserted into and coupled to the receiving hole 17B. The raised portion 17 and the first camera 7A may be placed on the curved part 16A of the base 16.

Figure 4:
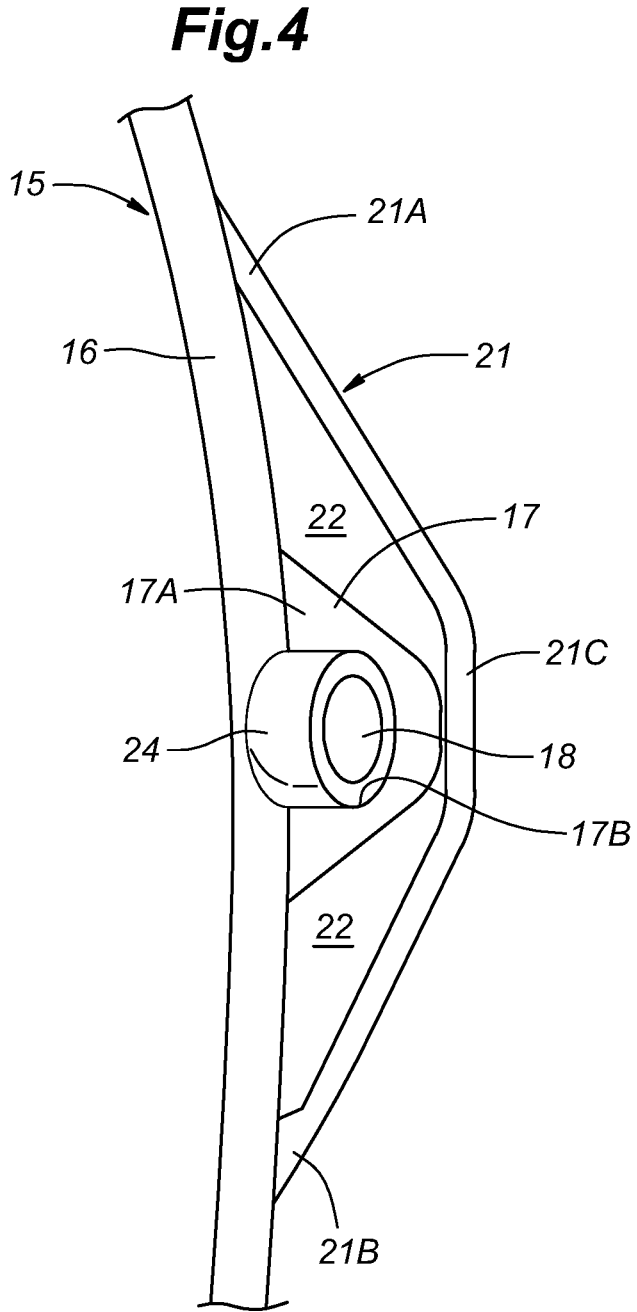
FIG. 4 is a front view of the garnish member as seen from the front.

Each garnish member 15 protrudes laterally outward from the base 16 and has a canopy 21 arranged around the first camera 7A. The canopy 21 extends in the up-down direction. The canopy 21 is coupled to the base 16 at its upper and lower ends 21A and 21B. As shown in FIGS. 3 and 4, each canopy 21 has a middle part 21C at a vertically middle position between the both ends of the canopy so that the middle part protrudes laterally outward beyond the upper and lower ends 21A and 21B of the canopy 21. An accommodation space 22 is defined between the canopy 21 and the base 16 so as to extend through the garnish member in the front-rear direction.

A raised portion 17 and a first camera 7A are disposed in the accommodation space 22. The raised portion 17 may be arranged in any one of the upper part, the middle part, and the lower part of the accommodation space 22.

The upper and lower ends 21A, 21B of the canopy 21 are located frontward of the middle part 21C of the canopy 21. The canopy 21 is curved along the curved part 16A of the base 16 as viewed from the side. An upper part of the front edge of the canopy 21 extends linearly from the upper end 21A toward the middle part 21C. A lower part of the front edge of the canopy 21 extends linearly from the lower end 21B toward the middle part 21C. The inclined surface 17A of the raised portion 17 is located rearward of the front edge of the canopy 21.

As shown in FIG. 4, the raised portion 17 may be coupled to the middle part 21C of the canopy 21. In this case, the accommodation space 22 is divided into an upper space and a lower space by the raised portion 17. In other words, the two accommodation spaces 22 are defined above and below the raised portion 17. The front edge of the raised portion 17 may be located rearward of the front edge of the canopy 21 at the same vertical position.

The canopy 21 is arranged outside the FOV of the first camera 7A provided at the raised portion 17. The outer surface of the base 16 defines a groove 24 extending frontward from the raised portion 17. This groove 24 prevents the base 16 from moving into the FOV of the first camera 7A. The groove 24 preferably has an arc shape in cross section.

In the present embodiment, the vehicle 1 is configured to allow for capturing an image of a surrounding area along a side of the vehicle regardless of whether the door 4 is open or closed. In addition, the vehicle 1 is configured to allow for capturing an image of passengers getting on and off the vehicle. A first camera 7A can capture an image of a passenger getting in and out of the vehicle 1 through the front and rear passenger openings 3A and 3B. A first camera 7A can cooperate with the other first camera 7A, the third cameras 7C, and the fourth camera 7D to acquire images of a surrounding area of the vehicle 1.

As a first camera 7A is arranged above the lower end of the window panel 6, dust and liquid blown up from the road surface are prevented from reaching the camera 7. Moreover, as the first camera 7A is arranged above the support member 11 that forms the door mirror of a corresponding door, the first camera 7A is allowed to acquire an image of a frontward view from the vehicle 1 from above the support member 11.

A first camera 7A is provided on a corresponding garnish member 15, which allows for simplification of a mount structure for mounting the first camera 7A to the vehicle body 2. Moreover, the first camera 7A and the garnish member are 15 allowed to be prepared as an assembly.

The canopy 21 can protect the camera 7 from liquid such as rainwater and dust. In addition, the canopy 21 can prevent objects such as stones and people from coming into contact with the camera 7. Furthermore, the canopy 21 can reduce the light reflected by the outer surface of the vehicle body 2 or other objects to the first camera 7A.

The accommodation space 22 defined between the base 16 and the canopy 21 extends through the garnish member in the front-rear direction, which allows for the rearward discharge of liquids such as rainwater and foreign matter that have entered the accommodation space 22 from the front.

As a first camera 7A is attached to the raised portion 17, the optical axis 8A of the first camera 7a can be directed frontward. In addition, the raised portion 17 is coupled to the canopy 21, which allows for improvement of the rigidity of the canopy 21.

Specific embodiments of the present invention are described herein for illustrative purposes. However, the present invention is not limited to those specific embodiments, and various changes may be made to the embodiments. For example, left and right passenger openings 3 may be provided in the vehicle body 2. In this case, the left and right first cameras 7A should be arranged rearward of the respective passenger openings 3. Left and right support members may be provided to protrude laterally outward from the respective sides of the vehicle body 2 where each support member is provided with a corresponding first camera 7A.

Figure 5:
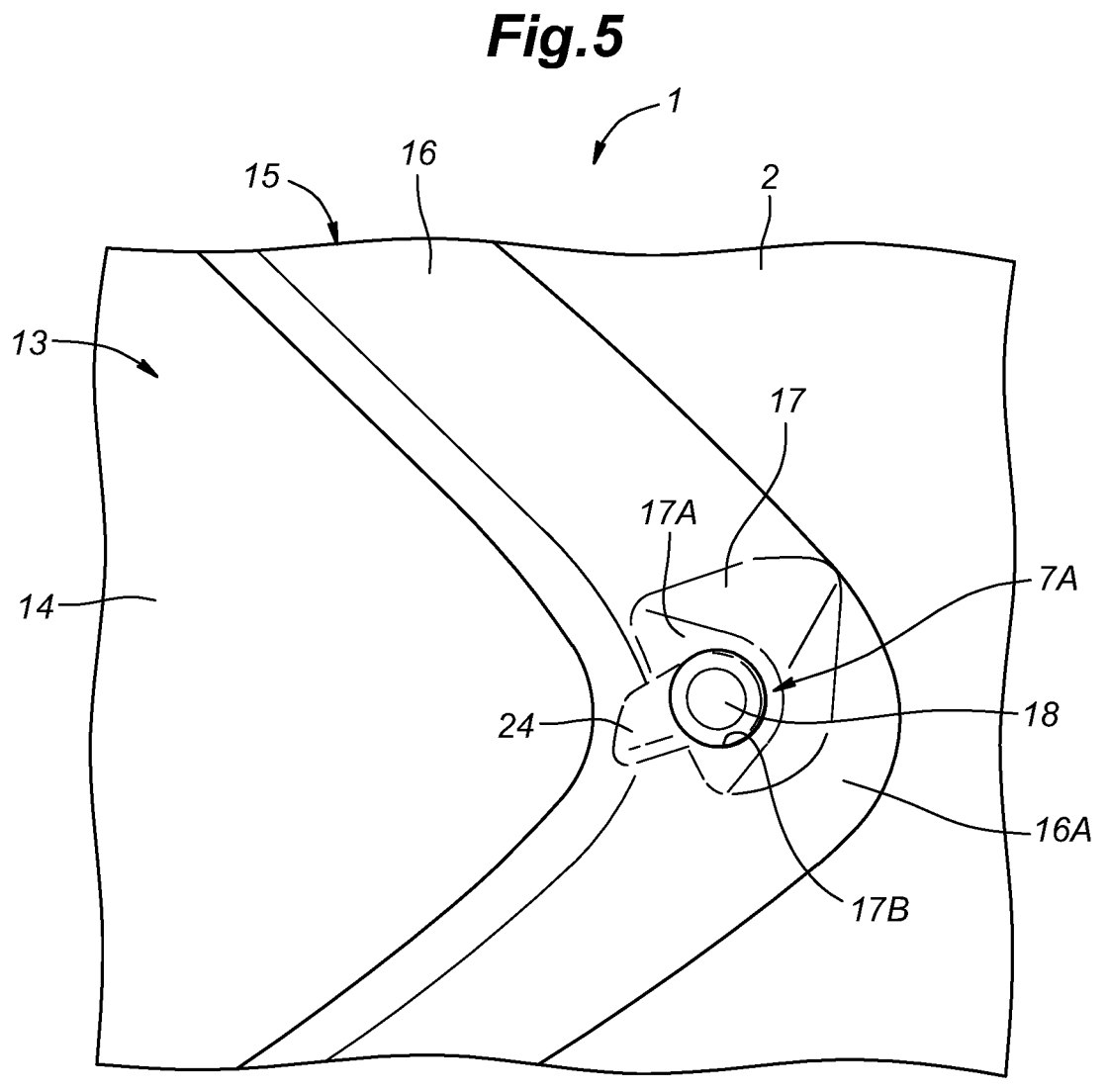

The canopy 21 is not an essential element for a vehicle of the present invention. Thus, as shown in FIG. 5, a vehicle may be provided with no canopies 21 in a variant of the embodiment.

Figure 6:
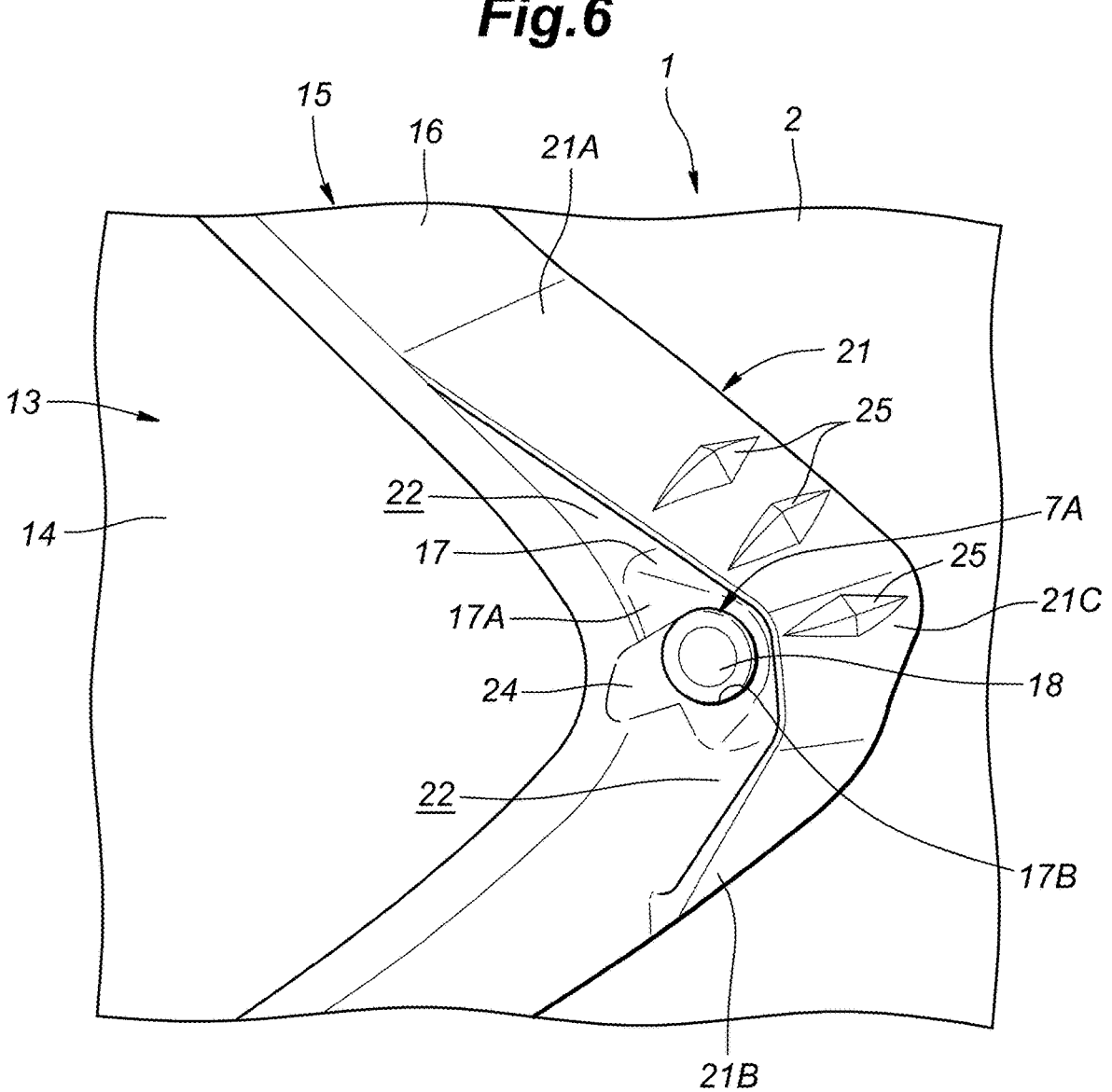
FIG. 6 is a perspective view showing a garnish member according to another variant of the embodiment.

As shown in FIG. 6, in another variant of the embodiment, the outer surface of a canopy 21 may be provided with a plurality of ridges 25 extending in the front-rear direction. The plurality of ridges 25 are arranged vertically side by side. Each ridge 25 extends along the front-rear direction and has a front end, a rear end, and a middle portion between the two ends. The middle portion has a vertical width (width in the vertical direction) which is greater than that of either of the ends. Each ridge 25 is preferably arranged above the first camera 7A.

Each ridge 25 shapes the air flows along the outer surface of the canopy 21 and reduces the swirling flow, which reduces air resistance of the canopy 21. In addition, each ridge 25 causes rainwater flowing on the outer surface of the canopy 21 to flow rearward, thereby preventing rainwater from flowing from the front edge of the canopy 21 to the first camera 7A.

Figure 7:
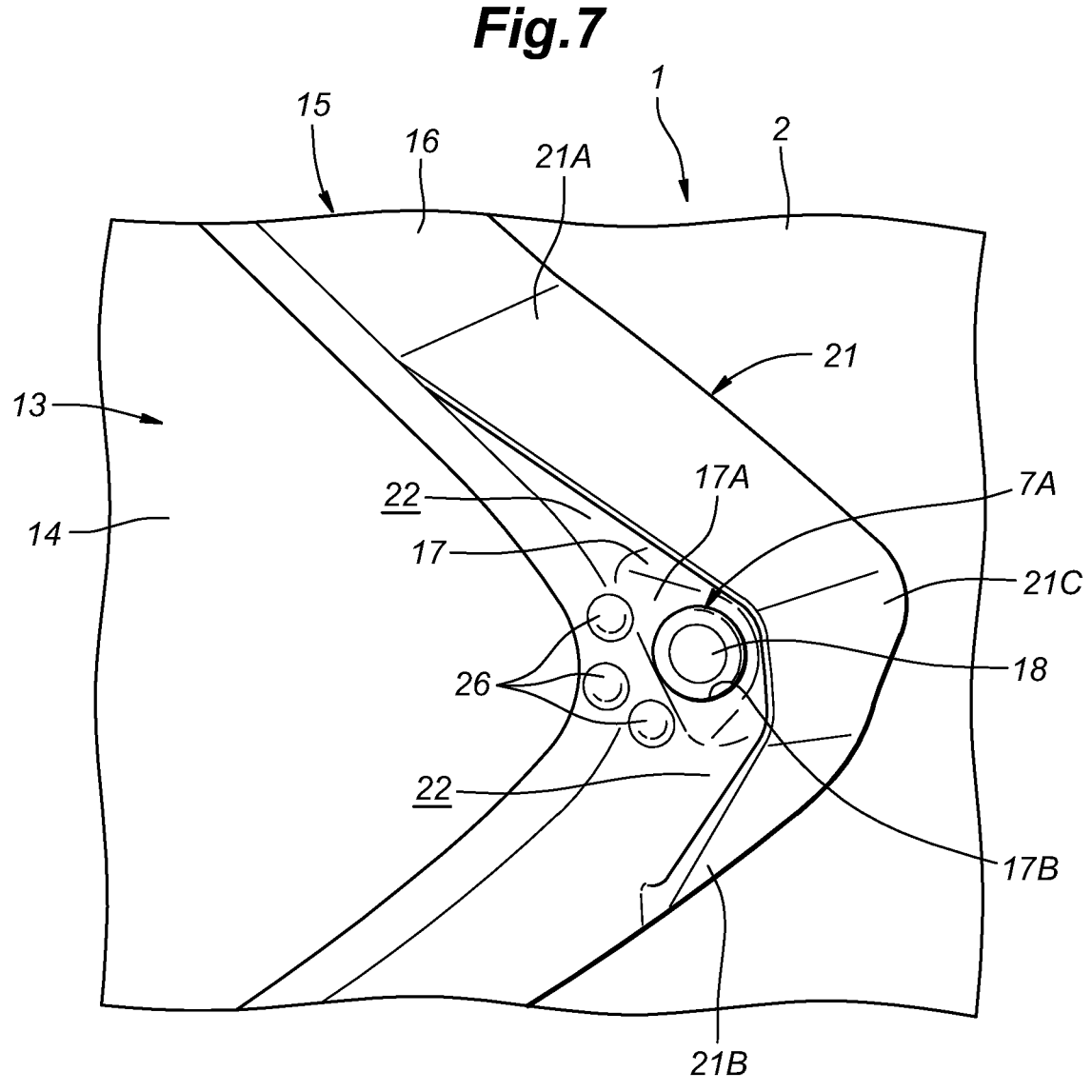
FIG. 7 is a perspective view showing a garnish member according to yet another variant of the embodiment.

As shown in FIG. 7, in yet another variant of the embodiment, at least one protrusion 26 may be provided on the outer surface of the base 16 in front of the first camera 7A. As shown in FIG. 7, a plurality of protrusions 26 may be arranged to be distributed vertically. In this case, the upper end of the protrusion 26 at the highest position is preferably arranged above the upper end of the lens 18 of the first camera 7A, while the lower end of the protrusion 26 at the lowest position is preferably arranged below the lower end of the lens 18 of the first camera 7A.

Figure 8:
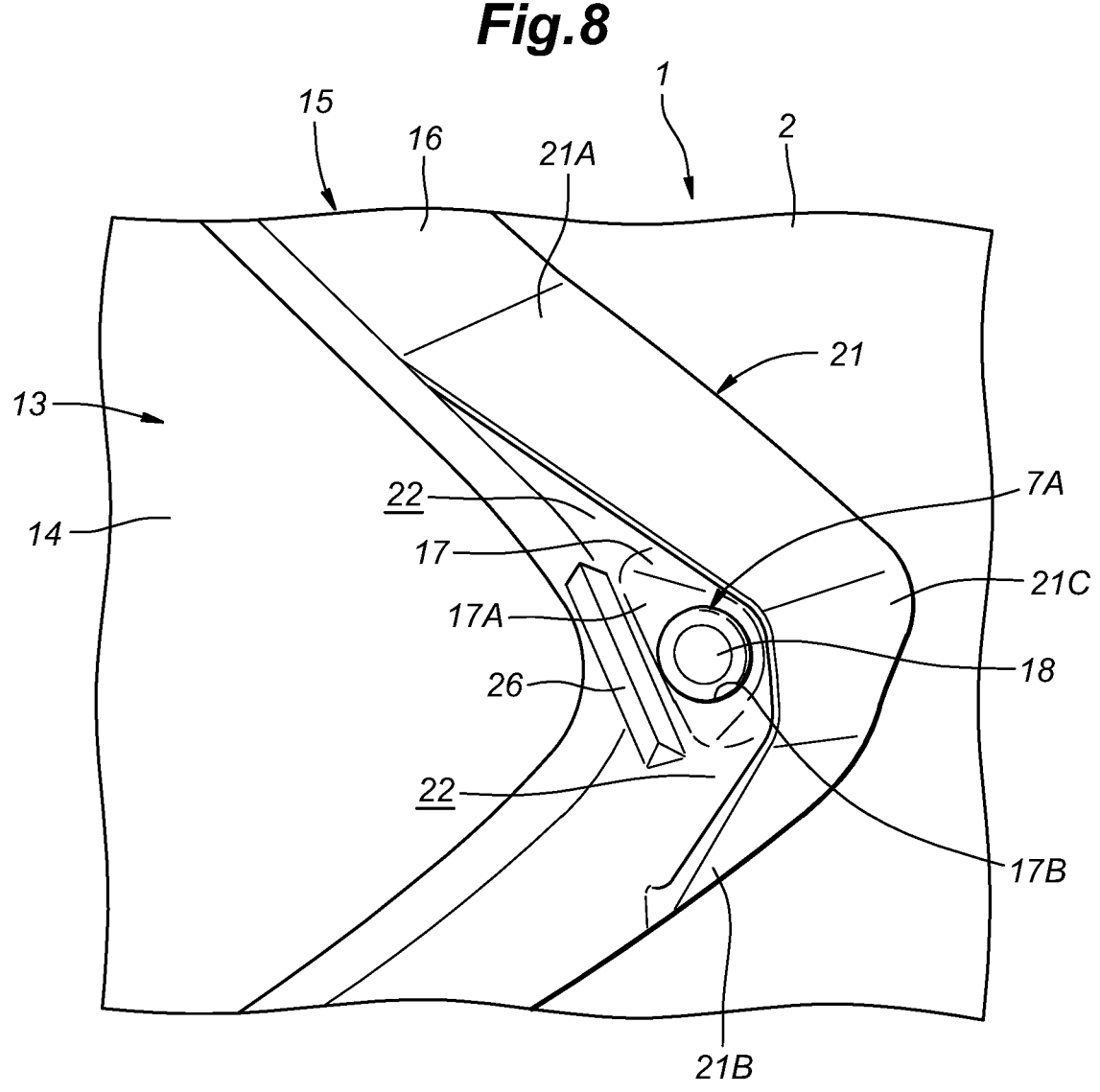
FIG. 8 is a perspective view showing a garnish member according to a further variant of the embodiment.

As shown in FIG. 8, in a further variant of the embodiment, a single protrusion 26 may be provided to extend vertically. The upper end of the protrusion 26 is preferably arranged above the upper end of the lens 18 of the first camera 7A, while the lower end of the protrusion 26 is preferably arranged below the lower end of the lens 18 of the first camera 7A.

When the vehicle is traveling, a protrusion 26 causes air to flow along a surface of the base 16 at different flow rates. Specifically, air flows at higher rates above and below the protrusion 26 and at lower rates at locations where the air flow faces the protrusion 26. As a result, water such as rainwater flowing toward the front of the protrusion 26 flows up and down along the protrusion 26, thereby preventing water drops from adhering to the first camera 7A.

One or more protrusions 26 may be provided on a garnish member 15 having no canopy 21, as shown in FIG. 5.

Figure 9:
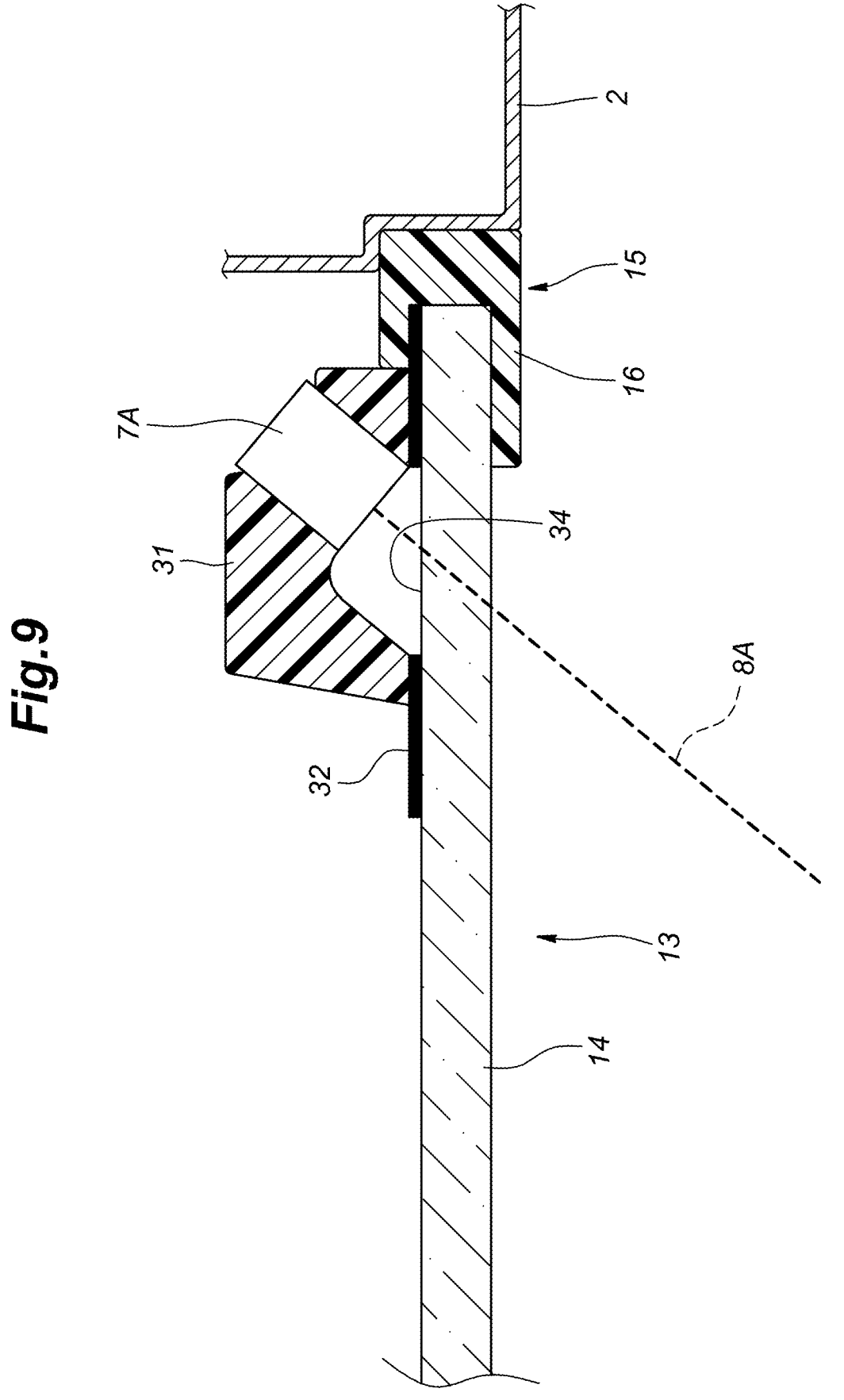
FIG. 9 is a horizontal sectional view showing an extension window, a garnish member, and a camera according to a variant of the embodiment of the present invention.

As shown in FIG. 9, a first camera 7A may be provided on or attached to the inner side of a window panel 14 at an extension window 13. In this case, the optical axis 8A of the first camera 7A preferably extends outward through the window panel 14. In some cases, the first camera 7A may be supported by the garnish member 15 or by another holder 31 provided on the vehicle body 2. Such a camera holder 31 may be integrally formed with a garnish member 15.

Moreover, a colored layer 32 is provided on the edge of the window panel 14 for the extension window 13. The colored layer 32 is preferably a black ceramic layer extending on the inner surface of the extension window 13. Furthermore, in the extension window 13, a transparent part

34 is formed so as to face the first camera 7A. The colored layer 32 preferably extends so as not to cover the transparent part 34. In this case, the first camera 7A is preferably configured to capture an image of a view of the outside of the vehicle through the transparent part 34.

The invention claimed is:

1. A vehicle, comprising:
   a vehicle body having a passenger opening on a side thereof;
   a camera provided on the side of the vehicle body and rearward of the passenger opening, such that the camera has an optical axis oriented in a laterally outward and frontward direction;
   an extension window located on the side of the vehicle body and rearward of the passenger opening;
   a window panel provided on the extension window; and
   a garnish member made of a plastic material and provided at edges of the extension window and the window panel so as to hide edges of the extension window and the window panel, and
   wherein the camera is provided on the garnish member.

2. The vehicle as claimed in claim 1, wherein the vehicle body comprises a door at the passenger opening, wherein the door has a door window in an upper part thereof, and wherein the camera is located above a lower end of the door window.

3. The vehicle as claimed in claim 2, wherein the door is provided with a side mirror, and wherein the camera is located above an upper end of the side mirror.

4. The vehicle as claimed in claim 1, wherein the garnish member comprises a base which extends along the edge of the extension window, and on which the camera is placed, and a canopy which projects laterally outward from the base and extends around the camera.

5. The vehicle as claimed in claim 4, wherein the canopy has an upper end and a lower end that are bonded to the base, and a middle part extending more laterally outward than the upper and lower ends,
   wherein the canopy and the base define an accommodation space therebetween, and
   wherein the camera is located within the accommodation space.

6. The vehicle as claimed in claim 5, wherein the base has a raised portion that protrudes laterally outward in the accommodation space, and
   wherein the camera is provided on the raised portion.

7. The vehicle as claimed in claim 6, wherein the raised portion is coupled to the middle part of the canopy so that the accommodation space is divided into an upper accommodation space above the raised portion and a lower accommodation space below the raised portion.

8. The vehicle as claimed in claim 1, wherein the camera is placed on an inner side of the window panel so that the optical axis of the camera extends outward through the window panel and is provided on the garnish via a camera holder integrally formed with the garnish member.

9. The vehicle as claimed in claim 8, wherein the window panel is provided with a colored layer and a transparent part that faces the camera, wherein the colored layer extends on the window panel so as not to cover the transparent part.

\* \* \* \* \*